United States Patent [19]

Haigler

[11] Patent Number: 5,568,701

[45] Date of Patent: Oct. 29, 1996

[54] MEANS AND METHOD FOR AUTOMATIC, SELF-DISPENSING, TIMED-RELEASE, CONSTANT FEEDING OF POTTED PLANTS

[76] Inventor: John C. Haigler, 4420 N. Buckskin Way, Tucson, Ariz. 85715

[21] Appl. No.: 395,460

[22] Filed: Feb. 27, 1995

[51] Int. Cl.⁶ .................................................. A01G 29/00
[52] U.S. Cl. ............................................. 47/48.5; 47/79
[58] Field of Search ..................... 239/602; 222/541.1, 222/541.6, 541.7, 541.8, 541.9; 47/79, 48.5 R, 48.5 G

[56] References Cited

U.S. PATENT DOCUMENTS

| | | | |
|---|---|---|---|
| 689,248 | 12/1901 | Timm | 47/48.5 G |
| 3,917,120 | 11/1975 | Larenz | 222/541.9 |
| 4,051,628 | 10/1977 | Knapp et al. | 47/48.5 |
| 4,056,898 | 11/1977 | Brucato | 47/48.5 |
| 4,089,133 | 5/1978 | Duncan | 47/48.5 |
| 4,158,269 | 6/1979 | Williams et al. | 47/48.5 |
| 4,248,227 | 2/1981 | Thomas | 222/541.9 |
| 4,321,937 | 3/1982 | Littlehale | 137/78.3 |
| 4,474,595 | 10/1984 | Lawhon et al. | 71/28 |
| 4,578,897 | 4/1986 | Pazar et al. | 239/63 |
| 5,212,904 | 5/1993 | Green et al. | 47/48.5 |
| 5,221,029 | 6/1993 | Stull | 222/541.9 |

FOREIGN PATENT DOCUMENTS

| | | | |
|---|---|---|---|
| 126574 | 11/1984 | European Pat. Off. | 47/48.5 G |
| 2512638 | 3/1983 | France | 47/48.5 G |
| 139663 | 7/1901 | Germany | 47/48.5 G |
| 1801268 | 5/1970 | Germany | 47/48.5 G |
| 2538783 | 3/1977 | Germany | 47/48.5 G |

*Primary Examiner*—Henry E. Raduazo
*Attorney, Agent, or Firm*—Thomas V. Malorzo

[57] ABSTRACT

A means and method for constant, timed-release, automatic dispersion of liquid fertilizer into the soil surrounding the roots of potted plants consisting of a bottle which is pre-filled with liquid plant nutrient material or plant fertilizer. The bottle is sealed with a cap which has an indentation or score line to facilitate breaking off the end of the cap to reveal a capillary tube which provides a flow passage from the bottle and through the cap. After the end of the cap is sheared off, the bottle unit is inverted and pushed into the soil adjacent the roots of the potted plant thereby enabling the flow of plant nutrient material or plant fertilizer into the soil for absorption by the plant.

4 Claims, 2 Drawing Sheets

MEANS AND METHOD FOR AUTOMATIC, SELF-DISPENSING, TIMED-RELEASE, CONSTANT FEEDING OF POTTED PLANTS

FIELD OF INVENTION

This invention relates to the field of potted plant fertilizer process, more particularly, devices for dispensing fertilizer to potted plants.

DESCRIPTION OF PRIOR ART

Various types of liquid feeding devices have been available in the past for the watering and nourishment of potted plants and the like. Such devices have been generally satisfactory, but certain disadvantages have been encountered, particularly in regard to the complexity and resulting expense of manufacture and in regard to the effectiveness of operation as well.

The related prior art discloses several patents which provide for the automatic nourishment or watering of plants include U.S. Pat. No. 4,089,133 to Duncan comprising a refillable reservoir which releases its contents into the soil by means of a felt tip. U.S. Pat. No. 4,578,897 to Pazar discloses an automatic dispenser which must be periodically refilled. U.S. Pat. No. 4,321,937 to Littlehale comprises a complicated automatic liquid delivery apparatus for providing nutrients to several plants at one time.

Additional related prior art devices include U.S. Pat. No. 4,056,898 to Brucato which comprises multiple refillable reservoirs in which plant nutrient mixtures and water are maintained separately and mixed prior to introduction into the plant growing medium. A device which proportionally releases nutrients with reference to the amount of water introduced therein is disclosed in U.S. Pat. No. 4,051,628 to Knapp. U.S. Pat. No. 4,158,269 to Williams discloses a device which dissolves dry fertilizer in water which is introduced into the device. The resultant fertilizer - water mixture is introduced zonally at different soil depths by means of holes at various heights along the delivery tube. Another zonal delivery system is depicted in U.S. Pat. No. 5,212,904 to Green in which nutrients are delivered through a tub its length which is inserted to the bottom of a plant or flower pot. Finally, a solid fertilizer stick which is designed to be inserted into growing medium and dissolved by water added as by a hose or rainwater is disclosed in U.S. Pat. No. 4,474,595 to Lawhon, et al.

OBJECTS AND ADVANTAGES

A general object of the invention is to provide a completely automatic, self-dispensing, constant delivery plant food dispenser which provides timed release of plant nutrients to the growing medium surrounding the plant being fed.

A further object of the invention is to provide a system which is clean handling and time saving in that no mixing of plant nutrients with delivery solution, such as water, is required, and clean up is minimized.

A still further object of the invention is to provide a plant food delivery system which has a low cost of manufacture and is well suited to quantity production.

An even further object of the invention is to provide a plant food delivery system which is not prone to deterioration of the device as a result of exposure to the environment or to plant food materials.

A still further object of the invention is to provide a plant food delivery system which is self metering so as to provide the user with a reliable measure of the quantity of nutrient remaining in the system.

A further object of the invention is to provide a plant food delivery system which constantly provides nutrients to the plant being fed in liquid form so as to avoid fertilizer "burn" which is frequently encountered when using dry fertilizers.

DESCRIPTION OF INVENTION

Figures 1, 2:
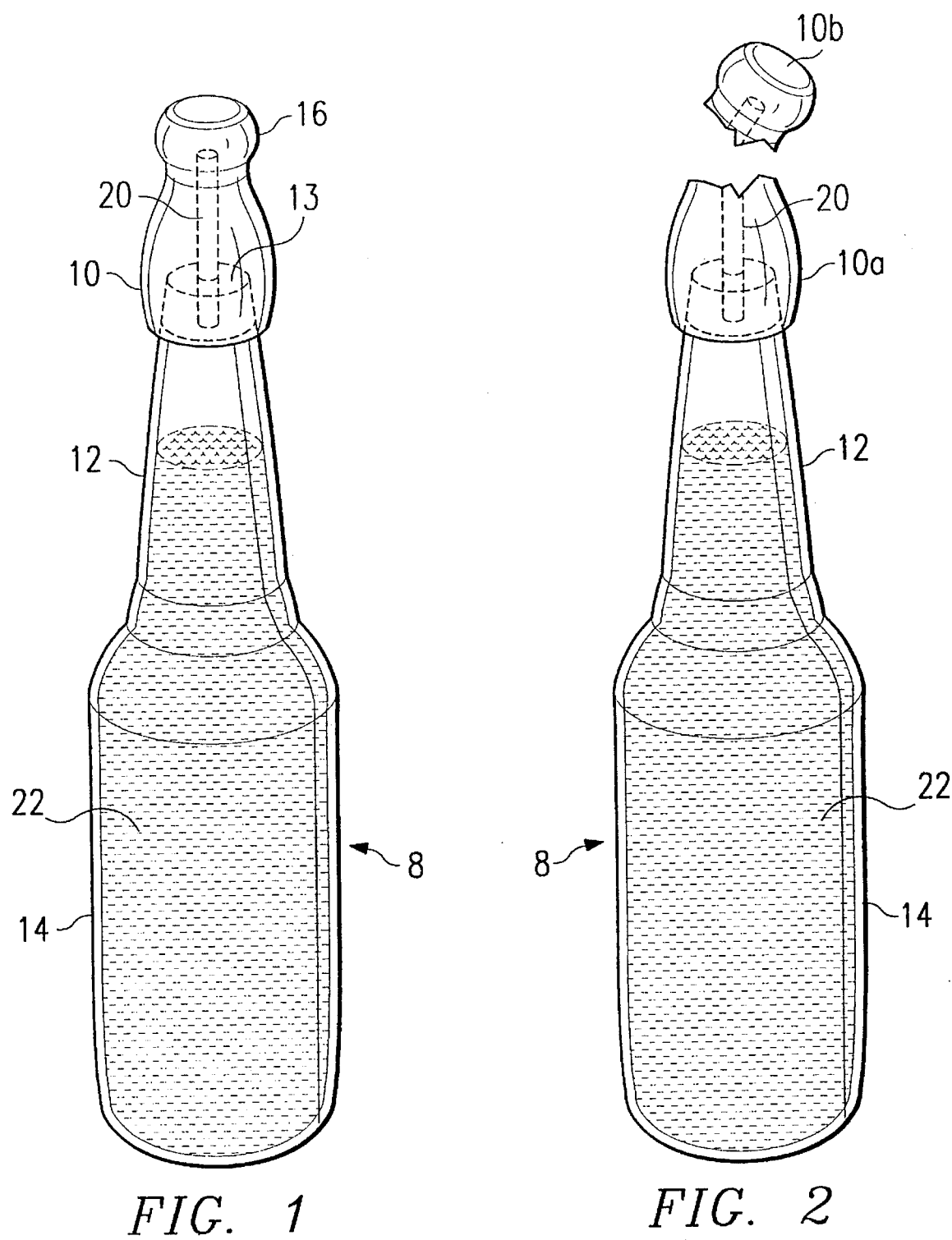
FIG. 1 is a perspective view of the device for automatic, self-dispensing, timed-release, constant-feeding dispenser of plant food.
FIG. 2 is a perspective view of the device for automatic, self-dispensing, timed-release, constant-feeding plant food dispensing system with cap removed from bottle showing metering means after top of cap has been snapped off.

FIG. 1 shows a perspective view of a basic version of a system for automatic, self-dispensing, timed-release, constant-feeding dispenser of plant food. Bottle 8 is made of light diffusing material such as, but not limited to semi-soft, translucent or transparent injection molded plastic, preferably light green in color. However, bottle 8 could be made from various other materials if desired.

Bottle unit 8 is a hollow container for liquids which has a cylindrically shaped lower section 14 attached to a conically shaped upper neck section 12 from which the frustrum has been removed thereby providing a fluid passage 13 between the interior of the bottle and the exterior thereof.

Cap 10 has a scored or indented area 16 to facilitate easy shearing of the end of the cap by the application of pressure to said scored or indented area to expose capillary delivery means 20 as described below.

Figure 3:
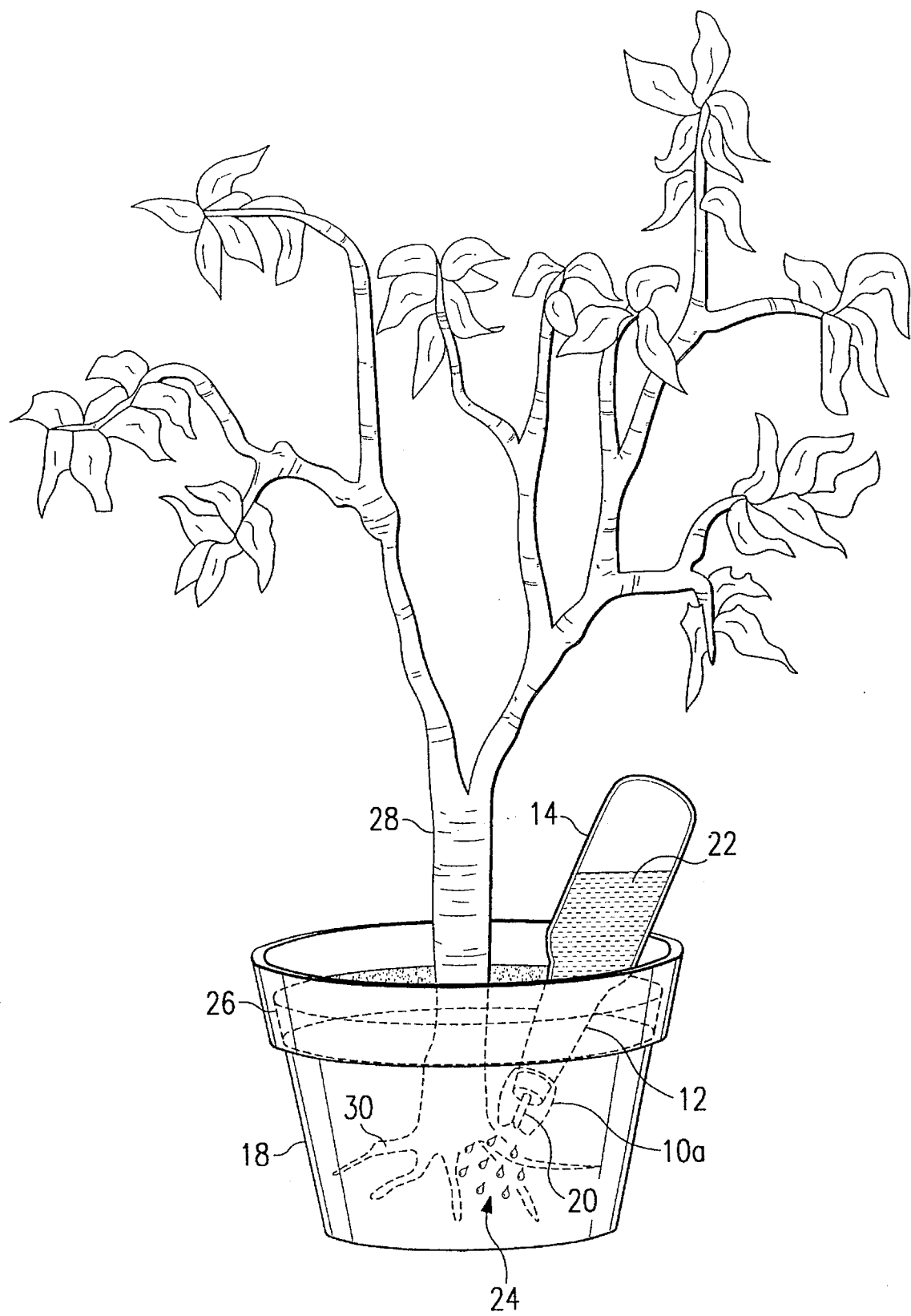
FIG. 3 is a side view of a flower pot and plant with its roots drawn in phantom. The neck of the system for automatic, self-dispensing, timed-release, constant-feeding dispenser of plant food shown in phantom is inserted into the soil.

Fixedly and sealingly mounted within cap 10 is capillary delivery means 20 with a first portion which extends above the sealed area and a second portion which extends below the sealed area from within cap 10 to beyond indented area 16. The bore of the capillary delivery means 20 determines the rate at which the liquid material will be delivered to the plant 28 as shown in FIG. 3.

Cap 10 is fixedly attached to the conically shaped upper section by fixing means commonly known in the art of bottle manufacture, such as glue, or the like.

METHOD OF OPERATION

To operate said device, the user would simply grasp bottle unit 8 which had been prefilled with a liquid such as plant nutrients or fertilizer and to which cap 10 had been previously attached as described herein with one hand and grasp top of cap 10 with the other hand. As shown in FIG. 2, the user then would snap off top of said cap 10b and discard same to expose a capillary delivery means through which the liquid fertilizer 22 therein may be discharged. User would then insert the neck of the plant food dispensing system into the soil adjacent to a potted plant. Liquid fertilizer would then be enabled to flow by gravity from said bottle unit into the soil, thus fertilizing the root system of said plant.

One skilled in the art will see that the plant food dispensing system shown herein is a convenient, non-messy, time-saving way to fertilize potted plants. While the above description contains many specificities, these should not be construed as limitations on the scope of the invention, but rather as an exemplification of one preferred embodiment thereof.

I claim:

1. An automatic, self-dispensing constant delivery plant food dispenser system comprising a generally hollow bottle unit prefilled with liquid fertilizer further comprising a cylindrically shaped hollow lower section and a conically shaped upper neck section from which the frustrum has been removed to provide a fluid passage between the interior of the bottle and the exterior thereof, an elongated cap having an indentation or score mark near the closed end thereof to facilitate the easy removal of the closed end of said cap without removing the cap from the upper neck section of the bottle unit, said cap having a capillary tube having a predetermined essentially constant flow rate integrally molded therein so that a first portion of said capillary tube extends above said indentation or score mark and a second portion of said capillary tube extends, into said fluid passage of said upper neck section of said bottle, said cap being fixedly and sealingly attached to said upper neck portion of said bottle.

2. The plant food dispensing system described in claim 1 wherein said bottle unit is constructed of light diffusing material.

3. The plant food dispensing system described in claim 2 wherein said bottle unit is constructed of injection molded plastic.

4. The plant food dispensing system described in claim 2 wherein said liquid material contains plant nutrient.

* * * * *